(12) United States Patent
Narendran et al.

(10) Patent No.: US 12,063,553 B1
(45) Date of Patent: Aug. 13, 2024

(54) DYNAMICALLY COMBINING AIR-INTERFACE RESOURCE RESERVATIONS

(71) Applicant: T-Mobile USA, Inc., Bellevue, WA (US)

(72) Inventors: Rajveen Narendran, Olathe, KS (US); Sreekar Marupaduga, Overland Park, KS (US); Mark Wade, Trimble, MO (US)

(73) Assignee: SPRINT SPECTRUM LLC, Bellevue, WA (US)

( * ) Notice: Subject to any disclaimer, the term of this patent is extended or adjusted under 35 U.S.C. 154(b) by 195 days.

(21) Appl. No.: 17/450,862

(22) Filed: Oct. 14, 2021

Related U.S. Application Data

(63) Continuation of application No. 15/929,226, filed on Feb. 17, 2020, now Pat. No. 11,178,577.

(51) Int. Cl.
*H04W 28/26* (2009.01)
*H04W 16/10* (2009.01)
*H04W 28/02* (2009.01)

(52) U.S. Cl.
CPC .......... *H04W 28/26* (2013.01); *H04W 16/10* (2013.01); *H04W 28/0205* (2013.01); *H04W 28/0236* (2013.01)

(58) Field of Classification Search
None
See application file for complete search history.

(56) References Cited

U.S. PATENT DOCUMENTS

| | | | |
|---|---|---|---|
| 7,130,641 B1 * | 10/2006 | Al-Khashti | H04W 4/02 455/456.2 |
| 9,655,127 B1 * | 5/2017 | Srinivas | H04W 72/52 |
| 11,265,945 B1 * | 3/2022 | Marupaduga | H04W 24/08 |
| 2010/0061334 A1 | 3/2010 | Gault et al. | |
| 2012/0182977 A1 | 7/2012 | Hooli et al. | |
| 2015/0215903 A1 | 7/2015 | Zhao et al. | |
| 2017/0339646 A1 | 11/2017 | Caretti et al. | |

FOREIGN PATENT DOCUMENTS

EP         3515135 A1 *   7/2019   .......... H04W 56/002

* cited by examiner

*Primary Examiner* — Peter Chen
*Assistant Examiner* — Jeff Banthrongsack
(74) *Attorney, Agent, or Firm* — Lee & Hayes P.C.

(57) ABSTRACT

A method and system for controlling air-interface resources on a radio-frequency (RF) carrier on which an access node provides wireless communication service. While the access node is set to apply at least two resource-reservations (e.g., PRB-reservations) that are mutually exclusive on the carrier, a computing system detects that resource-availability on the carrier is threshold low. And in response to the detecting, the computing system causes the access node to combine together the at least two resource-reservations on the carrier The combining together of the at least two resource-reservations on the carrier retains the at least two resource-reservations on the carrier but results in a reduction in aggregate total quantity of air-interface resources consumed by the at least two resource-reservations on the carrier.

20 Claims, 6 Drawing Sheets

DYNAMICALLY COMBINING AIR-INTERFACE RESOURCE RESERVATIONS

REFERENCE TO RELATED APPLICATION

This is a continuation of U.S. patent application Ser. No. 15/929,226, filed Feb. 17, 2020, the entirety of which if hereby incorporated by reference.

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which can facilitate mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IOT).

In accordance with the RAT, each access node could provide coverage on one or more radio frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could be defined as a specific range of frequency having a bandwidth and a center frequency and thus extending from a low-end frequency to a high-end frequency.

Further, on the downlink and uplink, the air interface on each carrier could be configured in a specific manner to define physical resources for carrying information (e.g., user-plane data and control-plane signaling) wirelessly between the access node and UEs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements, with each resource element spanning a respective symbol time segment and occupying a respective subcarrier, and the subcarrier of each resource element could be modulated to carry information. Further, in each subframe or other transmission time interval, the resource elements on the downlink and uplink of the example air interface could be grouped to define physical resource blocks (PRBs) that could be allocated as needed to carry data between the access node and served UEs.

In addition, certain resource elements on the example air interface could be designated for special use. For instance, on the downlink, certain resource elements could be set aside to define a downlink control region for carrying control signaling from the access node to UEs, certain resource elements could be designated to carry broadcast synchronization signals that UEs could detect as an indication of coverage on the carrier and to establish frame timing, and certain resource elements could be designated to carry a reference signal that UEs could measure to determine coverage strength, among other possibilities. And on the uplink, certain resource elements could be set aside to define an uplink control region for carrying control signaling from UEs to the access node, and certain resource elements could be designated to carry uplink reference signals or the like that could be used to evaluate uplink signal communications, among other possibilities.

Overview

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, with the access node to establish an RRC connection or the like through which the access node will then serve the UE on the carrier. Further, if the UE is not already registered for service with the core network, the UE could transmit to the access node an attach request, which the access node could forward to a core-network controller for processing. And the core-network controller could then coordinate setup for the UE of one or more bearers extending between the UE and a core-network gateway that provides transport-network connectivity.

Once the UE is so connected and registered with the example network, the access node could then serve the UE in a connected mode on the carrier, managing downlink air-interface communication of packet data to the UE and uplink air-interface communication of packet data from the UE.

For example, with the air interface described above, when packet data for the UE arrives at the core network from a transport network, the data could flow to the UE's serving access node, and the access node could then schedule and provide transmission of that data to the UE on particular downlink PRBs of the carrier. Likewise, when the UE has data to transmit on the transport network, the UE could transmit a scheduling request to the access node, the access node could responsively schedule transmission of that data from the UE on particular uplink PRBs of the carrier, and the UE could accordingly transmit the data to the access node for forwarding through the core network to the transport network.

The number of PRBs that the access node schedules for use to carry such downlink or uplink communication for a UE could vary based on the quantity of data to be transmitted and based on PRB availability, among other factors. In practice, the access node might serve multiple UEs at once on a given carrier, and the access node might work to fairly allocate the carrier's PRBs among the served UEs on an as needed basis.

For various reasons, an access node might also be set to reserve some its carrier's PRBs or other such air-interface resources on the downlink and/or uplink to use for a particular purpose, such as to serve just certain types of UEs and/or just certain types of communications, or for other reasons. A representative such PRB-reservation might be with respect to a set of one or more specifically designated PRBs on a per-subframe basis or the like, such as a group of N PRBs (contiguous or non-contiguous) at designated frequency position(s) in each subframe or one or more particular designated subframes per frame. The PRB-reservation may thus generally restrict allocation of the reserved PRBs for the designated purpose, making the PRBs unavailable to be allocated for other purposes.

By way of example, the access node might be set to reserve a group of the carrier's PRBs for use to serve Cat-M1 IoT devices, so that those PRBs could be allocated when necessary to serve Cat-M1 IoT devices and would be generally unavailable to be allocated for other purposes. As another example, the access node might be set to reserve a group of the carrier's PRBs for use to serve UEs that subscribe to a given mobile network operator (MNO (e.g., mobile virtual network operator (MVNO))), so that those PRBs could be allocated when necessary to serve UEs that subscribe to that MNO and would generally be unavailable to be allocated to other UEs. And as yet another example, the access node might be set to reserve yet a group of the carrier's resources for use to serve high-priority communications, so that those PRBs could be allocated when necessary to serve such communications and would generally be unavailable to be allocated for other communications.

An access node might be set to apply multiple such PRB-reservations (or other air-interface-resource reservations), each reserving a respective set of set of the carrier's PRBs (or other air-interface resources) separate and apart from each other PRB-reservation. For instance, on a per-subframe basis, the access node might be set to reserve one group of the carrier's PRBs for use to serve Cat-M1 devices and might be set to reserve another group of the carrier's PRBs for use to serve subscribers of a particular MVNO.

Unfortunately, however, a technical problem that can arise as a result of an access node applying multiple discrete PRB-reservations on its carrier is that the access node may have an insufficient number of remaining (unreserved) PRBs on the carrier to support certain other communications with a desired level of service. For instance, due to the multiple resource reservations, the access node might not have enough remaining PRBs per unit time to support timely scheduling latency-sensitive communications such as voice-over-packet (VOP) communications or the like. And as a result, those communications might be distorted or dropped, which could create user-experience issues.

Furthermore, this issue could be magnified in a scenario where one or more portions of the access node's carrier are otherwise set aside and thus also not available for allocation. An example of such a scenario is where the access node shares its carrier with another access node, in a dynamic spectrum sharing (DSS) arrangement for instance, with a portion of the carrier being set aside for use by the other access node and thus not available by the access node at issue for allocation to served UEs.

DSS could apply, for instance, at a cell site that supports operation according to two RATs (such as 4G LTE and 5G NR), having a first access node that provides first-RAT service and a second access node that provides second-RAT service. Given spectrum-licensing costs, an operator of such a cell site might configure both of these access nodes to operate on the same carrier as each other, i.e., with downlink and/or uplink communication on the same range of RF spectrum as each other, or on carriers that otherwise overlap with each other in RF spectrum. In this scenario, the first access node operating on a given carrier might set aside a portion of the carrier's RF spectrum for use by the second access node, so that that portion of the carrier's spectrum would be unavailable for use by the first access node to allocate to UEs. Further, the first access node might dynamically vary the extent of RF spectrum so set aside, based on usage history such as the extent of communications served respectively by each access node.

Setting aside a portion of the access node's carrier for spectrum-sharing purposes or for other purposes could itself reduce the number of PRBs that the access node has potentially available for allocation to UEs. On top of this, if the access node is also set to apply multiple PRB-reservations for specific purposes, the technical problem noted above could be exacerbated.

The present disclosure provides a mechanism that could help to address this problem. The mechanism could be implemented in a system in which an access node operates on a carrier and normally applies at least two distinct resource-reservations (e.g., PRB-reservations) on the carrier, one resource-reservation for purpose A (e.g., to serve a specific class of UEs and/or a specific type of communication) and another resource-reservation for purpose B (e.g., to serve another specific class of UEs and/or other specific type of communication). In accordance with the disclosure, a computing system could detect that the access node has threshold low PRB availability on the carrier, and the computing system could responsively cause the access node to combine together the two distinct resource-reservations, partially or fully, so as to maintain the resource-reservations for purposes A and B but to reduce the aggregate extent of air-interface resources consumed by those resource-reservations.

The combining of the resource-reservations together could involve reconfiguring the resource-reservations to be reservations of the same set of air-interface resource as each other. For instance, if the access node had a set of N PRBs reserved for purpose A and a separate and distinct set of N PRBs reserved for purpose B, the aggregate total number of PRBs that the access node would have reserved for purposes A and B would be 2N. By combining those PRB-reservations together to reserve just a set of N PRBs for purposes A and B (restricting those N PRBs to be used for just purposes A and B, so that the N PRBs would not be available for allocation for purposes other than A and B), the access node could thereby cut in half the aggregate total number of PRBs consumed by the PRB-reservations for purposes A and B.

Alternatively, the combining of the resource-reservations together could involve reconfiguring the resource-reservations to be reservations of respective sets of air-interface resources that partially overlap with each other. For instance, the access node could designate a specific set of N PRBs to be reserved for purpose A and a partially (i.e., not fully) overlapping set of N PRBs to be reserved for purpose B, so that the aggregate total number of PRBs reserved for purposes A and B would be more than N but less than 2N.

Other examples are possible as well, not limited to just two resource-reservations, not limited to PRB-reservations, not limited to combining resource-reservations that are the same size as each other, and not limited to a scenario where spectrum sharing is involved, among other variations.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system that includes collocated 4G and 5G access nodes supporting 4G LTE service and 5G NR service, where the 4G and 5G access nodes share spectrum and where the 4G access node is also set to apply at least two PRB-reservations respectively for purposes A and B as discussed above.

However, it should be understood that the disclosed principles could extend to apply in other scenarios as well, such as with a single-RAT system, with a single access node, with other RATs, with other network configurations, and with the variations noted above, among other possibilities. And it should be understood that other changes from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by a processing unit executing instructions stored in non-transitory data storage, along with associated circuitry or other hardware, among other possibilities.

Figure 1:
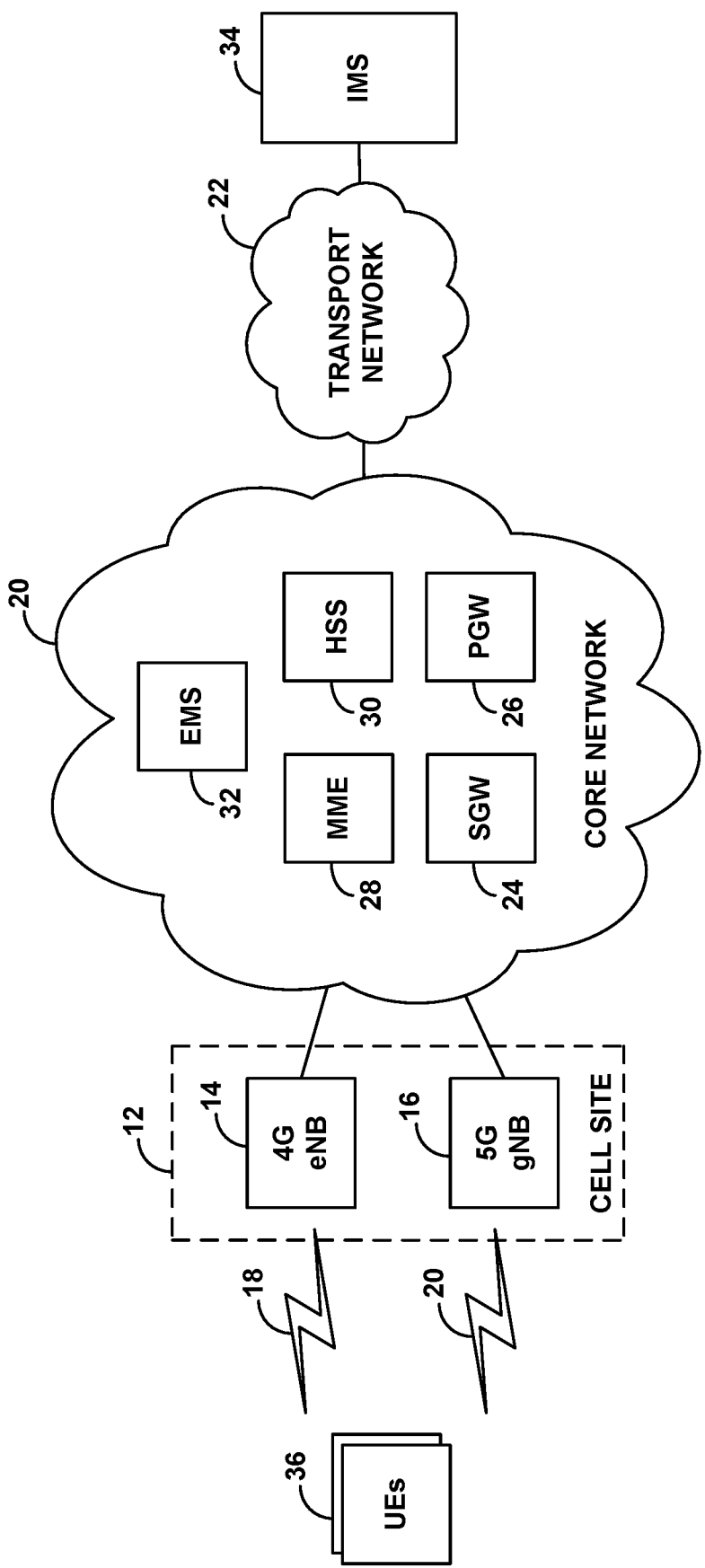
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage. Further, the access nodes could have respective antenna structures, which could be collocated with each other and configured to provide coverage of the same or similar direction and scope as each other.

Each access node could be configured to provide coverage and service on at least one carrier according to its respective RAT. In particular, the 4G eNB 14 could be configured to provide coverage and service on at least one carrier functioning as a 4G carrier 18, and the 5G eNB 16 could be configured to provide 5G coverage and service on at least one carrier functioning as a 5G carrier 20. Each of these carriers 18, 20 could be FDD or TDD as discussed above.

In an example implementation, the air interface on each such carrier could be configured to define various air-interface resources for carrying communications between the access node and UEs.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 KHz. With this example arrangement, the air interface on each carrier would define the array of resource elements as noted above, with each resource element each spanning a respective symbol time segment and occupying a respective subcarrier, and the access node and UEs could communicate with each other through modulation of the subcarriers to carry data in those resource elements.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain finite number of such PRBs across the bandwidth of the carrier within each timeslot.

In addition, certain resource elements on the downlink and uplink of the example air interface could be designated for particular use as discussed above.

For instance, on the downlink, certain resource elements per subframe (or per downlink subframe in TDD) could define a downlink control region for carrying control signaling such as scheduling directives and acknowledgements from the access node to UEs. And other resource elements per subframe could define a shared channel in which the access node could allocate PRB on an as-needed basis to carry data communications from the access node to UEs. Further, resource elements distributed in a predefined pattern throughout the carrier bandwidth per subframe could carry a broadcast reference signal as noted above, which UEs could measure as a basis to evaluate coverage strength and quality and to provide channel estimates to facilitate precoding, beamforming, or the like.

In addition, in certain downlink subframes, a group of resource elements centered on the center frequency of the carrier could carry the broadcast synchronization signals noted above, which UEs could detect as a way to discover coverage of the access node on the carrier and to establish frame timing. And in certain downlink subframes, a group of resource elements also centered on the center frequency of the carrier could carry broadcast system information messages, such as a master information block (MIB) and system information block (SIB) messages that UEs could read to obtain operational parameters such as carrier bandwidth (e.g., downlink bandwidth and/or uplink bandwidth) and other information.

On the uplink, on the other hand, certain resource elements per subframe (or per uplink subframe in TDD), such as sets of PRBs at the low-frequency end of the carrier and at the high-frequency end of the carrier, could define an uplink control region for carrying control signaling such as access requests, channel-quality reports, scheduling requests, and acknowledgements, from UEs to the access node. And other resource elements per subframe could define a shared channel in which the access node could allocate PRBs on an as-needed basis to carry data communications from UEs to the access node. Further, still other resources on the uplink could be used for other purposes as well, such as to carry uplink reference signals or the like.

The 4G air interface and 4G service provided by 4G eNB 14 on the 4G carrier 18 could also differ from the 5G air interface and 5G service provided by the 5G gNB 16 on the 5G carrier 20 in various ways now known or later developed. For example, one may provide variable subcarrier spacing, and the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In the example of FIG. 1, the 4G eNB and 5G gNB are each shown interconnected with a core network 20 that provides connectivity with a transport network 22. The core network 20 could be a packet-switched network configured as an Evolved Packet Core (EPC) network or a Next Generation Core (NGC) core network, among other possibilities, with entities having Internet Protocol (IP) addresses and being configured to communicate with each other through virtual packet-tunnels or the like.

In an example EPC arrangement, as shown, the core network includes a serving gateway (SGW) 24 and a packet-data-network gateway (PGW) 26, for carrying user-plane communications through the core network between an access node and the transport network. Further, the core network includes a mobility management entity (MME) 28, which functions as a core-network controller, responsible for managing UE attachment and bearer setup, among other operations, and a home subscriber server (HSS) 30, which stores UE profile records and may specify service-subscription plans, UE configurations, and/or other such UE capability information.

The example core network is also shown including an element management system (EMS) 32, which could operate as a central repository of operational data for the wireless communication network and to control and manage operation of various network elements, to help ensure optimal use of their resources. In practice, entities such as the access nodes could regularly report to the EMS various operational data, such as data regarding connectivity and service of UEs, and data regarding access node load (e.g., PRB utilization) and performance, among others. And the EMS could oversee operation of the access nodes and other entities, providing operation directives or the like to which the entities could be configured to respond accordingly.

The network of FIG. 1 could be implemented by a given MNO, to which UEs may subscribe to receive wireless communication service. Further, the network could provide service on behalf of another MNO, such as an MVNO as noted above, to which other UEs may subscribe to receive wireless communication service, among other possibilities.

As further shown, the core network and/or transport network could include or provide connectivity with an example Internet Multimedia Subsystem (IMS) 34. The IMS could include various proxy servers and media servers configured to provide packet-based real-time media services, such as VOP-call services for served UEs. For instance, to facilitate VOP-call service, a UE could engage in packet-based call-setup signaling, such as Session Initiation Protocol (SIP) signaling with the IMS to establish a packet-based real-time media session that extends between the UE and the IMS via the UE's serving access node and the core network, and the IMS could establish a connection with a remote call party and bridge that connection with the UE's packet-based real-time media session, so that the UE and remote party could then engage in voice-call communication.

For representative VOP communication, voice could digitized and encoded using a codec that might encode and output voice frames of 20 milliseconds each or so. The encoded data could then be packetized and transmitted to the other end, where the data could be de-packetized, decoded, and played out. Thus, as a UE is engaged in a VOP call, a sequence of VOP packets could pass respectively in each direction to and from the UE, carrying voice communications respectively in each direction.

FIG. 1 also depicts multiple UEs 36 that could be within coverage of cell site 12. When each such UE initially enters into coverage of the cell site, the UE could discover threshold strong coverage of a given access node, such as 4G eNB 14 or 5G gNB 16, and, as noted above, could then engage in random-access and connection signaling, to establish an RRC connection with the access node. Further, if appropriate, the UE could engage in attach signaling through the access node with the MME. And after authentication of the UE, the MME could coordinate setup for the UE of one or more user-plane bearers each including a radio-access bearer (RAB) having a data radio bearer (DRB) extending over the air between the access node and the UE and an S1-U tunnel between the access node and the SGW, and an S5 tunnel between the SGW and the PGW. In addition, the access node could establish for the UE a context record, indicating the UE's connected state and one or more bearers configured for the UE.

In relation to this attachment process or at another time, the access node could also obtain configuration and capabilities data regarding the UE, such as data indicating the UE device type (e.g., whether the device is an Cat-M1 IoT type device or a consumer device) and service subscription details (e.g., whether the device supports voice call communication, etc.), and could store this data in the UE context record for reference while serving the UE. For instance, during the attachment process, the MME could obtain this data from the HSS and could covey the data to the access node for storage, or the UE could provide the access node with a report of this data. Further, the EMS could also have access to this data regarding the UE, perhaps obtaining the data from the HSS or access node, among other possibilities.

Each bearer that the MME sets up for the UE could have a corresponding quality of service class indicator (QCI) level, which could indicate a class or type of communication that would be carried by the bearer. For instance, upon initial attachment, the MME might set up for the UE a best-efforts general Internet bearer (e.g., QCI 8 or 9) for use to carry general Internet communications. And if the UE is a particular type of device, such as a Cat-M1 device, the MME might set up a bearer with a QCI level deemed appropriate for that type of UE (e.g., a QCI 7 bearer). Further, if the UE subscribes to VOP service, the MME might set up for the UE an IMS-signaling bearer (e.g., QCI 5) for carrying SIP signaling between the UE and the IMS. Other examples are possible as well.

Once the UE is so connected with an access node and attached, as noted above, the access node could then serve the UE. For instance, as the access node receives data destined to the UE, the access node could allocate downlink PRBs to carry a block of that data at a time to the UE, could transmit an associated scheduling directive to the UE, and could accordingly transmit the data to the UE in the allocated downlink PRBs. And as the UE has data to transmit, UE could request resource allocation, the access node could allocate uplink PRBs to carry a block of the data at a time from UE and could transmit an associated scheduling directive to the UE, and the UE could accordingly transmit the data to the access node in the allocated uplink PRBs.

Through this process, the UE might thereby engage in packet-data communication of particular types of data, on particular bearers. For instance, when engaging in general Internet communication, the UE might communicate on a QCI 8 or 9 bearer, unless the UE is an IoT device, in which case the UE might communicate on a QCI 7 bearer. And if and when a VOP call is established for the UE, the network might set up guaranteed-bit-rate QCI 1 bearer for the UE, and the UE might communicate voice-packet data of the call on that QCI 1 bearer.

Note also that cell site 12 might support dual-connectivity, such as EUTRA-NR Dual Connectivity (EN-DC), where each of various UEs could be served concurrently by both the 4G eNB 14 and the 5G gNB 16. In a representative implementation of EN-DC, for instance, a UE might initially connect with the 4G eNB that would function as a master access node (master Node-B (MeNB)) for the dual-connectivity service. The 4G eNB could then coordinate setup for the UE of a secondary connection between the UE and the 5G gNB, possibly with split-bearer configuration. With these two connections thus set up, the 4G eNB and 5G gNB could then concurrently serve the UE with packet-data communications. This dual-connectivity arrangement may help to provide the UE with increased peak data rate and may also help to facilitate network transitions form one RAT to another, among other possible benefits.

As noted above, the example implementation could address a situation where an access node shares RF spectrum of its carrier with another access node and is set to apply two or more PRB-reservations on its carrier, which may result in the access node having insufficient PRB availability to serve communications with a desired service level.

In the example implementation, the access node at issue could be the 4G eNB 14. Further, we can assume by way of example that the 4G carrier 18 on which the 4G eNB operates occupies the same RF spectrum as the 5G carrier 20 on which the 5G gNB operates. For instance, both carriers could be 5 MHz wide, ranging from the same low-end frequency to the same high-end frequency, even if the air interfaces defined on the carriers might differ in form or operation due to differences between 4G and 5G. In an alternative implementation, the 4G and 5G carriers might just partially overlap with each other, and/or the carriers might be of different bandwidth than each other.

We can also assume that the 4G eNB and 5G gNB implement DSS, perhaps controlled by the 4G eNB. For instance, the 4G eNB might set aside a specific portion of the channel bandwidth of 4G carrier 18 for use of that RF spectrum by the 5G gNB, thus making air-interface resources in that portion of the carrier unavailable for allocation by the 4G eNB. Further, the 4G eNB might dynamically vary the extent of 4G carrier 18 set aside for use by the 5G eNB, perhaps based on a ratio of the extent of data communications recently served by the 4G eNB on 4G carrier 18 to the extent of data communications recently served by the 5G gNB on 5G carrier 20.

To facilitate this, the 4G eNB and 5G gNB might engage in signaling with each other over an inter-access-node interface (e.g., an X2 interface). Through this signaling, the 4G eNB might learn how much data communication the 5G gNB has been serving so that the 4G eNB can set the DSS split, and the 4G eNB might then inform the 5G gNB what portion of RF spectrum will be used by the 5G gNB, with the remainder of the 4G carrier 18 being useable by the 4G eNB.

Whether this spectrum sharing is dynamic or static, the 4G eNB could configure itself accordingly, such as by programmatically storing a specification of what portion of 4G carrier 18 the 4G eNB will have for its own use. The 4G eNB could then operate accordingly, allocating PRBs just within that specified portion of the 4G carrier 18.

Further, as noted above, the 4G eNB could be set to apply at least two PRB-reservations within the shared channel region on which the 4G eNB operates within 4G carrier 18. Each of these PRB-reservations could be for a respective purpose (e.g., for use to serve a given type of UE and/or a given type of communication) as described above. And the PRB-reservations could occupy mutually exclusive sets of one or more PRBs of the 4G carrier 18, on a per subframe basis (e.g., in every subframe or in specific subframes). The 4G eNB could be configured to apply these PRB-reservations by storing a record that the 4G eNB is so configured, so that the 4G eNB would then programmatically apply the PRB-reservations in accordance with the stored record.

These PRB-reservations differ from PRB allocations by the access node. An example PRB-reservation reserves a set of one or more PRBs for a particular purpose, so that the PRBs would be restricted to allocation for that purpose and would be unavailable to allocate for other purposes regardless of whether the access node has allocated those PRBs for the particular purpose.

Figure 2:
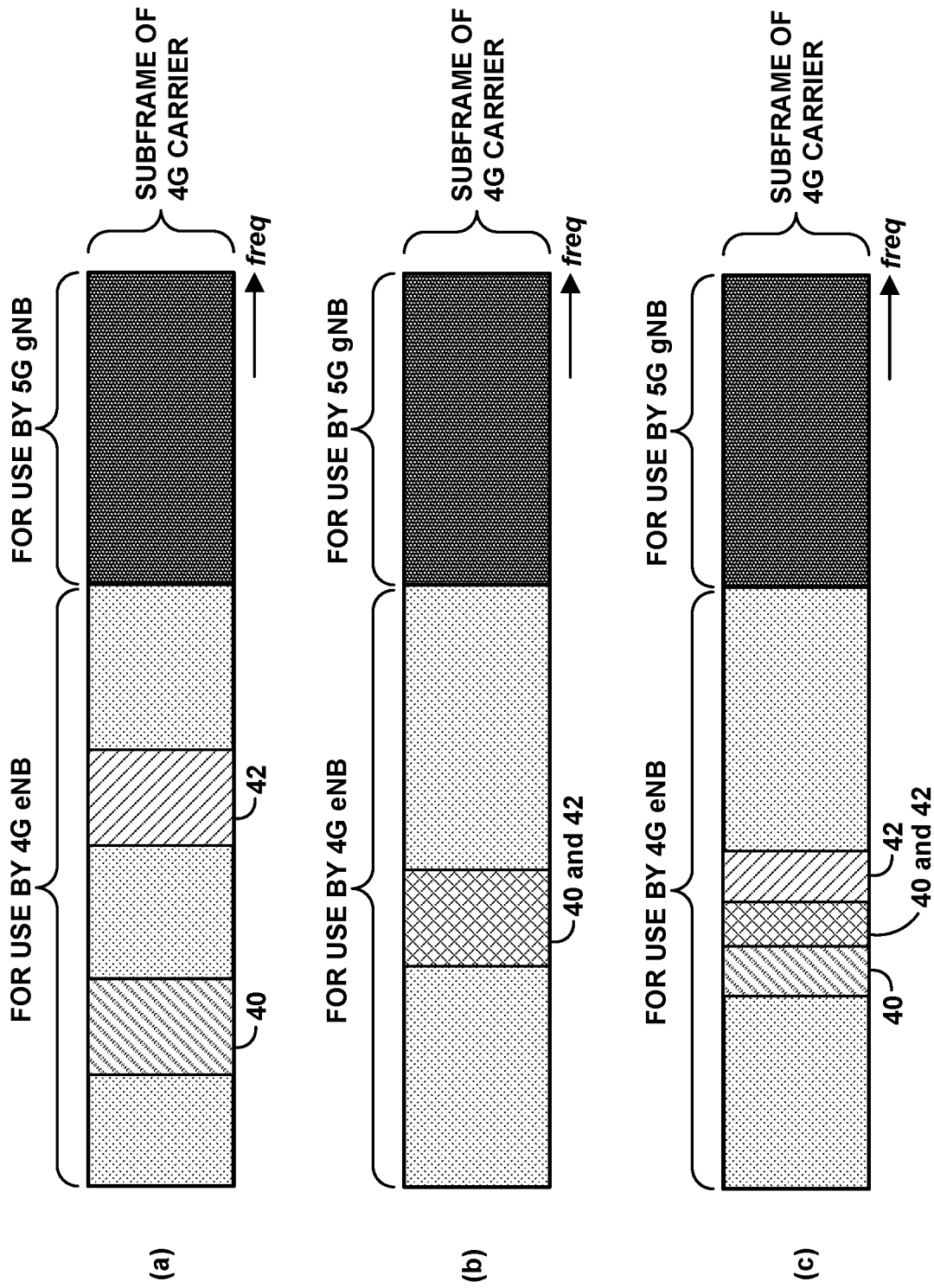
FIG. 2 is an illustration of at least a shared-channel region of an example subframe defined on an example carrier, showing separate resource-reservations and combined resource-reservations.

FIG. 2 is a simplified illustration of an example subframe of 4G carrier 18, which might represent a recurring configuration on the carrier in which the 4G eNB shares some RF spectrum with the 5G gNB and has the at least two example PRB-reservations. This subframe might be a downlink subframe or an uplink subframe. And for simplicity, we can assume that the figure specifically depicts the shared-channel region of the subframe, in which PRBs could be allocated for carrying communication between the 4G eNB and UEs.

As shown by way of example in FIG. 2(a), the frequency bandwidth of the carrier is currently divided into a first portion that set to be useable by the 4G eNB and a second portion that is set to not be useable by the 4G eNB but to instead be useable by the 5G gNB. Further, in the usable first portion, the 4G eNB is currently set to apply a first PRB-reservation 40 for purpose A (e.g., for use in serving a particular class of UEs and/or a particular type of communication) and to apply a second PRB-reservation 42 for purpose B (e.g., for use in serving another particular class of UEs and/or another particular type of communication).

In an example implementation, PRB-reservations 40 and 42 might be reservations of the same number of PRBs as each other but are mutually exclusive. Thus, the two PRB-reservations may consume an aggregate total number of PRBs that is the sum of their respective numbers of PRBs reserved. By way of example, each PRB-reservation might be a reservation of a separate, respective group of 6 PRBs. Thus, the two PRB-reservations may consume a total of 12 PRBs.

As noted above, given this aggregate total number of reserved PRBs, together with the portion of the 4G carrier that is set aside for use by the 5G gNB, the remaining capacity of the 4G carrier available for PRB allocation will be limited. And as a result, especially if the 4G eNB is serving many UEs at once and/or is serving heavy data communication traffic, the 4G eNB might encounter difficulty in adequately serving certain communications. For instance, the 4G eNB might encounter PRB-contention situations, where the 4G eNB seeks to allocate PRBs for two different UEs at the same time but does not have sufficient PRBs available to grant both allocations.

This problem could particularly impact voice communications or other such packet-based real-time media communications. For instance, due to the limited PRB availability, the 4G eNB might not have enough PRBs available per unit time to support timely scheduling voice-packet communication to or from a given UE. And as a result, those voice communications might experience voice muting due to dropping of untimely voice packets.

In practice, the 4G eNB might generate and store a performance record indicating for the carrier the level of PRB availability and/or conversely the level of PRB utilization. For instance, the 4G eNB could keep a record over a sliding window of time of the number of allocable PRBs on the carrier that go unallocated, a ratio of unallocated to allocated PRBs on the carrier, the number of instances of PRB contention encountered by the 4G eNB, and/or the number of instances of voice muting or the like experienced by UEs being served by the 4G eNB, among other possibilities. Further, the 4G eNB could report these or associated performance metrics to the EMS 32, which can store them as well.

In line with the discussion above, a computing system implemented by the 4G eNB, the EMS, or another entity could then detect when the PRB availability on the 4G carrier 18 is threshold low and could responsively cause the 4G eNB to combine together, partially or fully, the two PRB-reservations 40 and 42, so as to help increase PRB availability and/or to avoid or reduce the likelihood of problems that could result from low PRB availability.

In an example implementation, the computing system could regularly monitor performance metrics such as those noted above, comparing the performance metrics with one or more predefined thresholds, to determine when the PRB availability on the 4G carrier is threshold low. For instance, the computing system could determine when the number or percentage of allocable PRBs that have been available has been lower than a predefined threshold, and/or the computing system could determine when the rate of voice muting (e.g., rate of voice-packet loss) has been higher than a threshold, among other possibilities. Further, the computing system could conduct this analysis with respect to just established performance metrics indicating a relatively current state of the carrier, or perhaps predictively based on past records for a similar time of day or the like.

Upon detecting that PRB availability on the 4G carrier is threshold low, the computing system could then cause the 4G eNB in various ways to combine together the two PRB-reservations. For instance, if the computing system is implemented by the 4G eNB itself, then the computing system could simply implement the combining. Or if the computing system is implemented at an entity other than the 4G eNB, then the computing system could transmit to the eNB a directive to which the eNB is configured to respond by implementing the combining.

The combining together of the PRB-reservations could also take various forms, ultimately achieving the goal of retaining the PRB-reservations but with a reduced aggregate total number of PRBs being reserved on a per subframe or other basis.

By way of example, the combining of PRB-reservations could involve reconfiguring the PRB-reservations to be reservations of the same PRBs as each other, as shown in FIG. 2(b). For instance, the 4G eNB could reconfigure the PRB-reservations from each occupying a separate respective group of 6 PRBs to both occupying a common, shared group of 6 PRBs. With this reconfiguration, rather than reserving 12 PRBs in total for purposes A and B, the 4G eNB would then reserve just 6 PRBs in total for purposes A and B. Similarly, 4G eNB node could reconfigure the PRB-reservations from each occupying a separate respective group of 6 PRBs to both occupying a common, shared group of another number of PRBs, such as 8 PRBs. Thus, rather than reserving 12 PRBs in total for purposes A and B, the 4G eNB would reserve just 8 PRBs in total for purposes A and B.

As another example, the combining of PRB-reservations could involve reconfiguring the PRB-reservations to be just partially overlapping in PRBs with each other, as shown in FIG. 2(c). For instance, the 4G eNB could reconfigure the PRB-reservations from each occupying a separate respective group of 6 PRBs to each occupying 6 PRBs within a common, shared group of 9 PRBs. For example, the 4G eNB could configure the PRB-reservation 40 for purpose A to occupy the 6 PRBs lowest in frequency in the group of 9 PRBs, and the 4G eNB could configure the PRB-reservation 42 for purpose B to occupy the 6 PRBs highest in frequency in the group of 9 PRBs, so that the center 3 PRBs in the group would be reserved for both purposes A and B. Thus, rather than reserving 12 PRBs in total for purposes A and B, the 4G eNB would reserve just 9 PRBs in total for purposes A and B.

Numerous other examples are possible as well.

The 4G eNB could implement the combining by changing its stored record that defines the PRB-reservations 40 and 42, so that the 4G eNB would then programmatically apply the reconfigured PRB-reservations in accordance with the changed record. Optimally by so combining the PRB-reservations as noted above, the 4G eNB could thereby help to increase PRB availability on the carrier and/or to reduce the likelihood of the above discussed problems that could result from low PRB availability on the carrier.

Note also that, in an alternative embodiment or phrased another way, the two PRB-reservations might initially overlap with each other to some extent, and the combining that occurs in response to detecting the threshold low PRB availability could involve reconfiguring the PRB-reservations to overlap with each other to a greater extent.

For instance, two PRB-reservations of 10 PRBs each might initially have 2-PRB overlap, so that they consume an aggregate total of 18 PRBs. And the combining of those PRB-reservations could involve reconfiguring them to have a 8-PRB overlap, so that they would instead consume an aggregate total of just 12 PRBs. Or the combining of those PRB-reservations could involve reconfiguring them to occupy a common set of 10 PRBs so that they would consume an aggregate total of just 10 PRBs.

And likewise with this phrasing, two completely separate PRB-reservations could be considered to have a zero-PRB overlap (i.e., with zero as their extent of overlap), and the combining of the PRB-reservations could involve reconfiguring them so that they have a PRB overlap of greater than zero PRBs. Other examples are possible as well.

Still further, note that the act of combining could also involve changing the quantity of PRBs consumed by at least one of the PRB-reservations. But the end result of the combining should still be a reduced aggregate total number of PRBs consumed.

Figure 3:
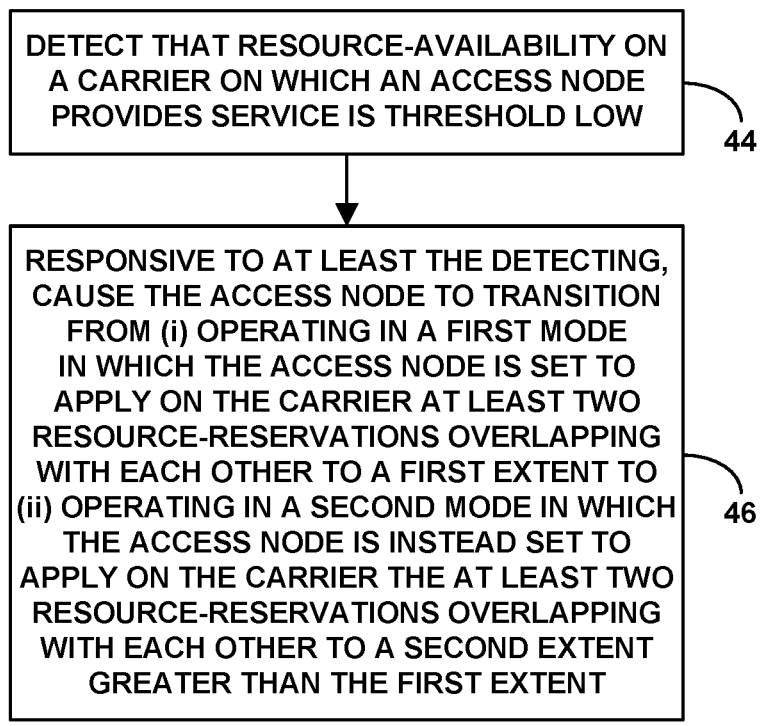
FIG. 3 is flow chart depicting an example method in accordance with the disclosure.

FIG. 3 is a flow chart depicting a method that could be carried out in accordance with the present disclosure, to control air-interface resources on an RF carrier on which an access node provides wireless communication service.

As shown in FIG. 3, at block 44, the method includes detecting that resource-availability on the carrier is threshold low. And at block 46, the method includes, responsive to at least the detecting (possibly considering one or more additional factors as well), causing the access node to transition from (i) operating in a first mode in which the access node is set to apply on the carrier at least two resource-reservations overlapping with each other to a first extent to (ii) operating in a second mode in which the access node is instead set to apply on the carrier the at least two resource-reservations overlapping with each other to a second extent greater than the first extent.

As noted above, this method could be implemented by the access node and/or by the EMS or another entity external to the access node, among other possibilities. And if the method is implemented by an external entity, the act of causing the access node to transition from the first mode to the second mode could involve transmitting from the entity to the access node a directive to which the access node is configured to respond by carrying out the transition.

Further, in line with the discussion above, the carrier could define a plurality of PRBs, in which case the resource-availability could comprise PRB-availability, and the resource-reservations could comprise PRB-reservations. In addition, for PRBs or other types of air-interface resources, each of the resource-reservations could be for a respective different purpose than each other of the resource-reservations.

Still further, as discussed above, the act of detecting that resource-availability on the carrier is threshold low could involve detecting occurrence on the carrier of at least a predefined threshold extent of resource-contention, detecting occurrence on the carrier of at least a predefined threshold extent of loss of voice packets, and/or detecting at least a predefined threshold extent of resource-utilization on the carrier, among other possibilities.

Yet further, as discussed above, the method could be carried out while the access node shares a portion RF spectrum of the carrier with another access node, as that sharing could contribute to reduction of resource availability on the carrier.

In addition, as discussed above, the first extent of overlap of the at least two resource-reservations could be zero overlap, in which case the second extent of overlap would be greater than zero overlap, possibly complete overlap, or partial overlap.

Figure 4:
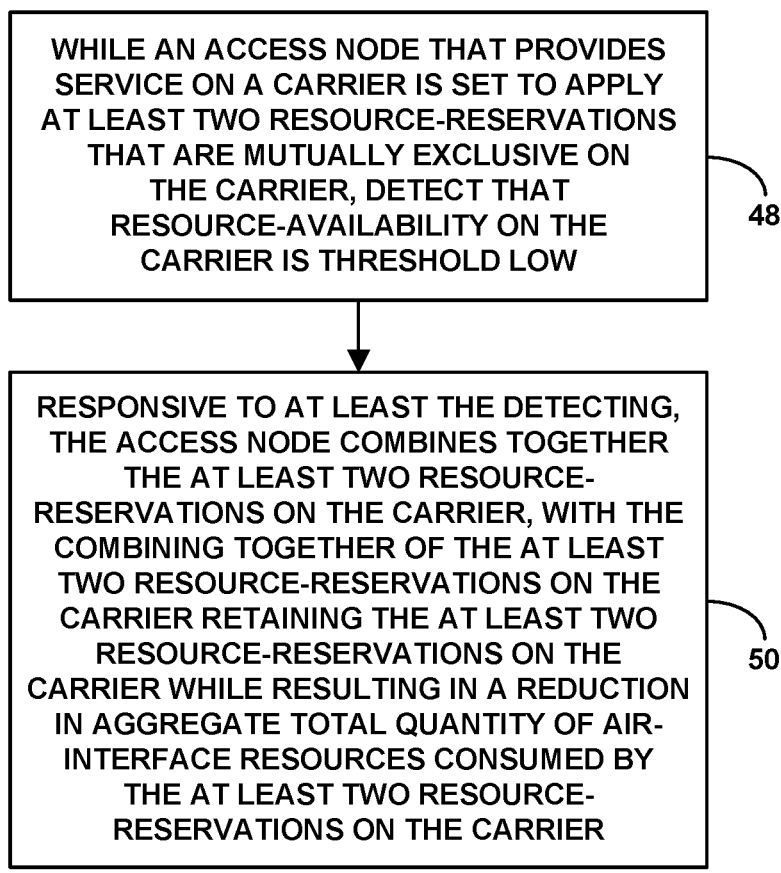
FIG. 4 is another flow chart depicting an example method in accordance with the disclosure.

FIG. 4 is next another flow chart depicting a method that could be carried out in accordance with the present disclosure, to control air-interface resources on an RF carrier on which an access node provides wireless communication service.

As shown in FIG. 4, at block 48, the method includes, while the access node is set to apply at least two resource-reservations that are mutually exclusive on the carrier, a computing system detecting that resource-availability on the carrier is threshold low. And at block 50, the method includes, responsive to at least the detecting, the computing system causing the access node to combine together the at least two resource-reservations on the carrier, wherein the combining together of the at least two resource-reservations on the carrier retains the at least two resource-reservations on the carrier while resulting in a reduction in aggregate total quantity of air-interface resources consumed by the at least two resource-reservations on the carrier.

Various other features discussed herein can be implemented in this context as well, and vice versa. For instance, the act of combining together the at least two resource-reservations on the carrier could involve reconfiguring the two resource-reservations so that they both occupy a common, shared set of air-interface resources on the carrier. Further, the act of combining together the at least two resource-reservations on the carrier could involve reconfiguring the two resource-reservations so that they partially or fully overlap with each other.

Figure 5:
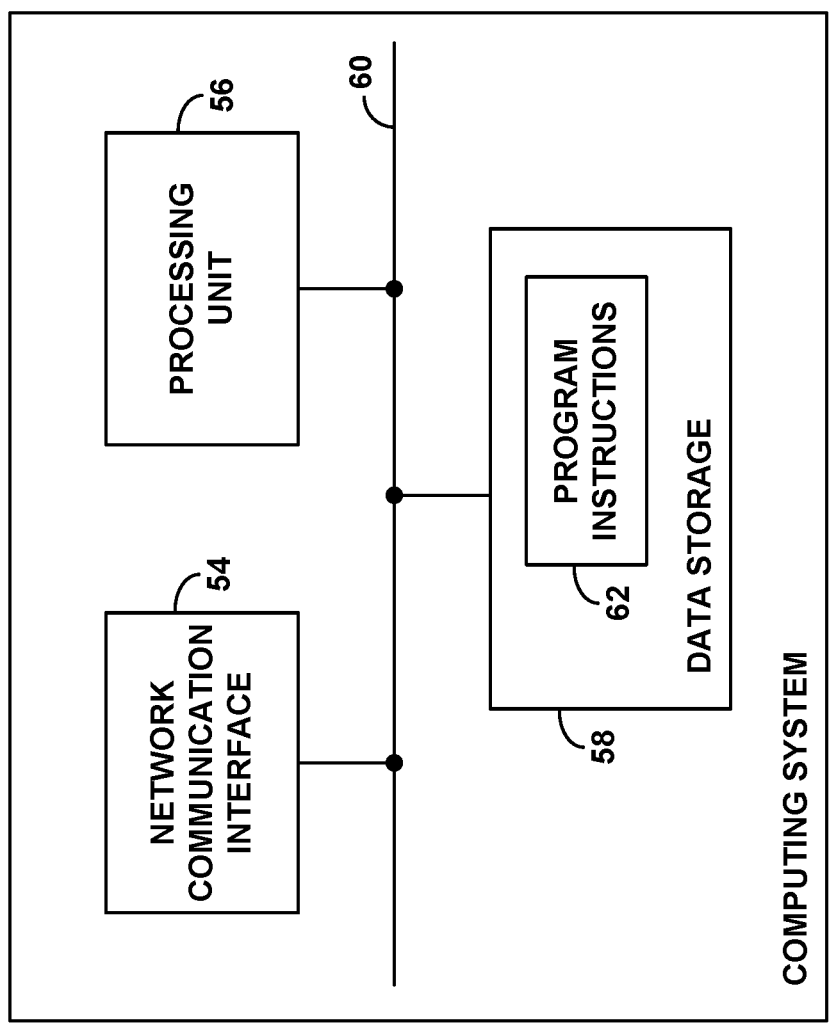
FIG. 5 is a simplified block diagram of an example computing system operable in accordance with the disclosure.

FIG. 5 is a simplified block diagram of an example computing system that could be configured to carry out the operations described herein, to control air-interface resources on an RF carrier on which an access node provides wireless communication service. As noted above, this computing system could be provided at the access node or at an EMS. Alternatively, the computing system could be provided as a standalone system and/or in another manner.

As shown in FIG. 5, the example computing system includes a network communication interface 54, at least one processing unit 56, and at least one non-transitory data storage 58, all of which could be integrated together and/or interconnected by a system bus, network, and/or other connection mechanism 60.

The network communication interface 54 could include a physical network connector and associated communication logic to facilitate network communication with various other entities. The at least one processing unit 56 could comprise one or more general purpose processors (e.g., microprocessors) and/or one or more special-purpose processors (e.g., application specific integrated circuits). And the at least one non-transitory data storage 58 could comprise one or more volatile and/or non-volatile storage components (e.g., magnetic, optical, or flash storage).

As shown, the data storage 58 could then store program instructions 62, which could be executable by the at least one processing unit 56 to carry out various operations described herein. For instance, the instructions could be executable to carry out the operations of FIGS. 3 and 4.

Figure 6:
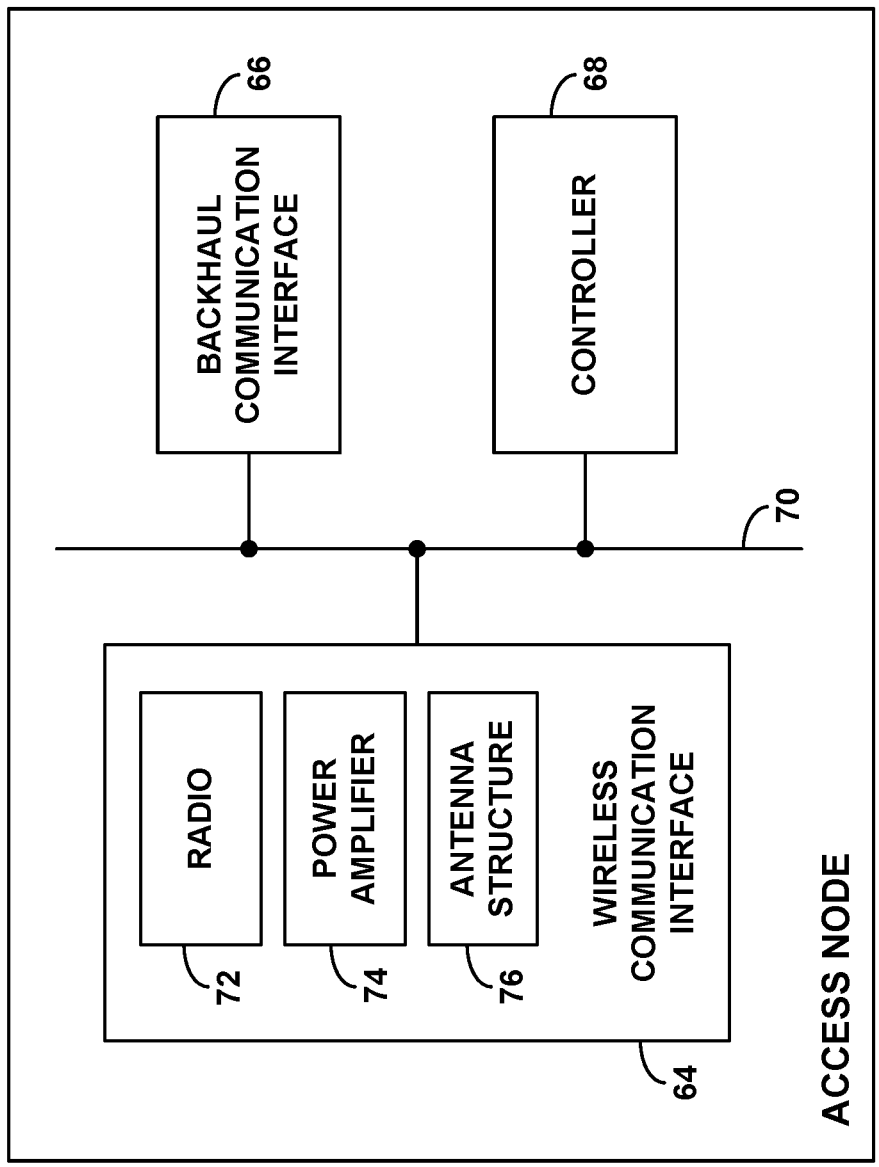
FIG. 6 is a simplified block diagram of an example access node operable in accordance with the disclosure.

Finally, FIG. 6 is a simplified block diagram of an example access node that could operate in accordance with the present disclosure, as 4G eNB 14 or 5G gNB 16 for instance.

As shown in FIG. 6, the example access node includes a wireless communication interface 64, a backhaul communication interface 66, and a controller 68, which could be integrated together and/or communicatively linked by a network, system bus, or other connection mechanism 70.

Wireless communication interface 64 includes a radio 72, a power amplifier 74, and antenna structure 76. The radio 72 could operate to interface between encoded baseband signals and radio frequency signals. The power amplifier 74 could operate to amplify signals for transmission by the antenna structure 76. And the antenna structure 76 could comprise a plurality of antennas for communicating over the air interface, optimally as an array such as a massive-MIMO array for instance, to facilitate beamforming and other operations.

Backhaul communication interface 66 could be a network communication interface (e.g., an Ethernet network interface port and/or connection) through which the access node can communicate with various other network entities.

And controller 68, which could comprise at least one processing unit, at least one non-transitory data storage, and program instructions stored in the data storage and executable by the processing unit, or could take other forms, could be operable to cause the access node to carry out various operations as described herein.

Various features described above can be implemented in this context as well, and vice versa.

Further, the present disclosure contemplates a computer-readable medium encoded with, storing, or otherwise embodying program instructions executable by a processing unit to carry out various operations described herein.

Exemplary embodiments have been described above. Those skilled in the art will understand, however, that changes and modifications may be made to these embodiments without departing from the true scope and spirit of the invention.

We claim:

1. A method for controlling air-interface resources on a radio-frequency (RF) carrier on which an access node provides wireless communication service, the method comprising:
    detecting that resource-availability on the RF carrier is threshold low; and
    responsive to at least the detecting, causing the access node to transition from (i) operating in a first mode in which the access node is set to apply on the RF carrier at least two resource-reservations overlapping with each other to a first extent to (ii) operating in a second mode in which the access node is instead set to apply on the RF carrier the at least two resource-reservations overlapping with each other to a second extent greater than the first extent, wherein detecting that resource-availability on the RF carrier is threshold low comprises detecting one or more occurrences that include occurrence on the RF carrier of at least a predefined threshold extent of loss of voice packets.

2. The method of claim 1, wherein the method is implemented by the access node.

3. The method of claim 1, wherein the method is implemented by an entity external to the access node, wherein causing the access node to transition from the first mode to the second mode comprises transmitting from the entity to the access node a directive to which the access node is configured to respond by carrying out the transition.

4. The method of claim 1, wherein the RF carrier defines a plurality of physical resource blocks (PREs), wherein the resource-availability comprises PRE-availability, and wherein the resource-reservations comprise PRE-reservations.

5. The method of claim 1, wherein the one or more occurrences further include occurrence on the RF carrier of at least a predefined threshold extent of resource-contention.

6. The method of claim 1, wherein the one or more occurrences further include at least a predefined threshold extent of resource-utilization on the RF carrier.

7. The method of claim 1, wherein the method is carried out while the access node shares a portion of RF spectrum of the RF carrier with another access node, wherein the sharing reduces resource availability on the RF carrier.

8. The method of claim 1, wherein each of the resource-reservations is for a respective different purpose than each other of the resource-reservations.

9. The method of claim 1, wherein, in the second mode, the access node is set to apply on the RF carrier the at least two resource-reservations overlapping fully with each other.

10. The method of claim 1, wherein the first extent of overlap of the at least two resource-reservations is zero overlap.

11. The method of claim 1, wherein the first extent of overlap of the at least two resource-reservations is partial overlap.

12. A method for controlling air-interface resources on a radio-frequency (RF) carrier on which an access node provides wireless communication service, the method comprising:
    while the access node is set to apply at least two resource-reservations that are mutually exclusive on the RF carrier, detecting by a computing system that resource-availability on the RF carrier is threshold low; and
    responsive to at least the detecting, causing by the computing system the access node to combine together the at least two resource-reservations on the RF carrier, wherein the combining together of the at least two resource-reservations on the RF carrier retains the at least two resource-reservations on the RF carrier while resulting in a reduction in aggregate total quantity of air-interface resources consumed by the at least two resource-reservations on the RF carrier, wherein detecting that resource-availability on the RF carrier is threshold low comprises detecting one or more occurrences that include occurrence on the RF carrier of at least a predefined threshold extent of loss of voice packets.

13. The method of claim 12, wherein the combining together of the at least two resource-reservations on the RF carrier comprises reconfiguring the at least two resource-reservations so that they both occupy a common shared set of air-interface resources on the earner.

14. The method of claim 12, wherein the combining together of the at least two resource-reservations on the RF carrier comprises reconfiguring the at least two resource-reservations so that they partially overlap with each other.

15. The method of claim 12, wherein the combining together of the at least two resource-reservations on the RF carrier comprises reconfiguring the at least two resource-reservations so that they fully overlap with each other.

16. A computing system configured to controlling air-interface resources on a radio-frequency (RF) carrier on which an access node provides wireless communication service, the computing system comprising:
    at least one a processing unit;
    at least one non-transitory data storage; and
    program instructions stored in the at least one non-transitory data storage and executable by the at least one processing unit to carry out operations including:
        detecting that resource-availability on the RF carrier is threshold low, and
        responsive to at least the detecting, causing the access node to transition from (i) operating in a first mode in which the access node is set to apply on the RF carrier at least two resource-reservations overlapping with each other to a first extent to (ii) operating in a second mode in which the access node is instead set to apply on the RF carrier the at least two resource-reservations overlapping with each other to a second extent greater than the first extent, wherein detecting that resource-availability on the RF carrier is threshold low comprises detecting one or more occurrences that include occurrence on the RF carrier of at least a predefined threshold extent of loss of voice packets.

17. The computing system of claim 16, wherein the one or more occurrences further include occurrence on the RF carrier of at least a predefined threshold extent of resource-contention.

18. The computing system of claim 16, wherein the one or more occurrences further include at least a predefined threshold extent of resource-utilization on the RF carrier.

19. The computing system of claim 16, wherein each of the resource-reservations is for a respective different purpose than each other of the resource-reservations.

20. The computing system of claim 16, wherein the RF carrier defines a plurality of physical resource blocks (PRBs), wherein the resource-availability comprises PRB-availability, and wherein the resource-reservations comprise PRE-reservations.

* * * * *